Patented June 5, 1951

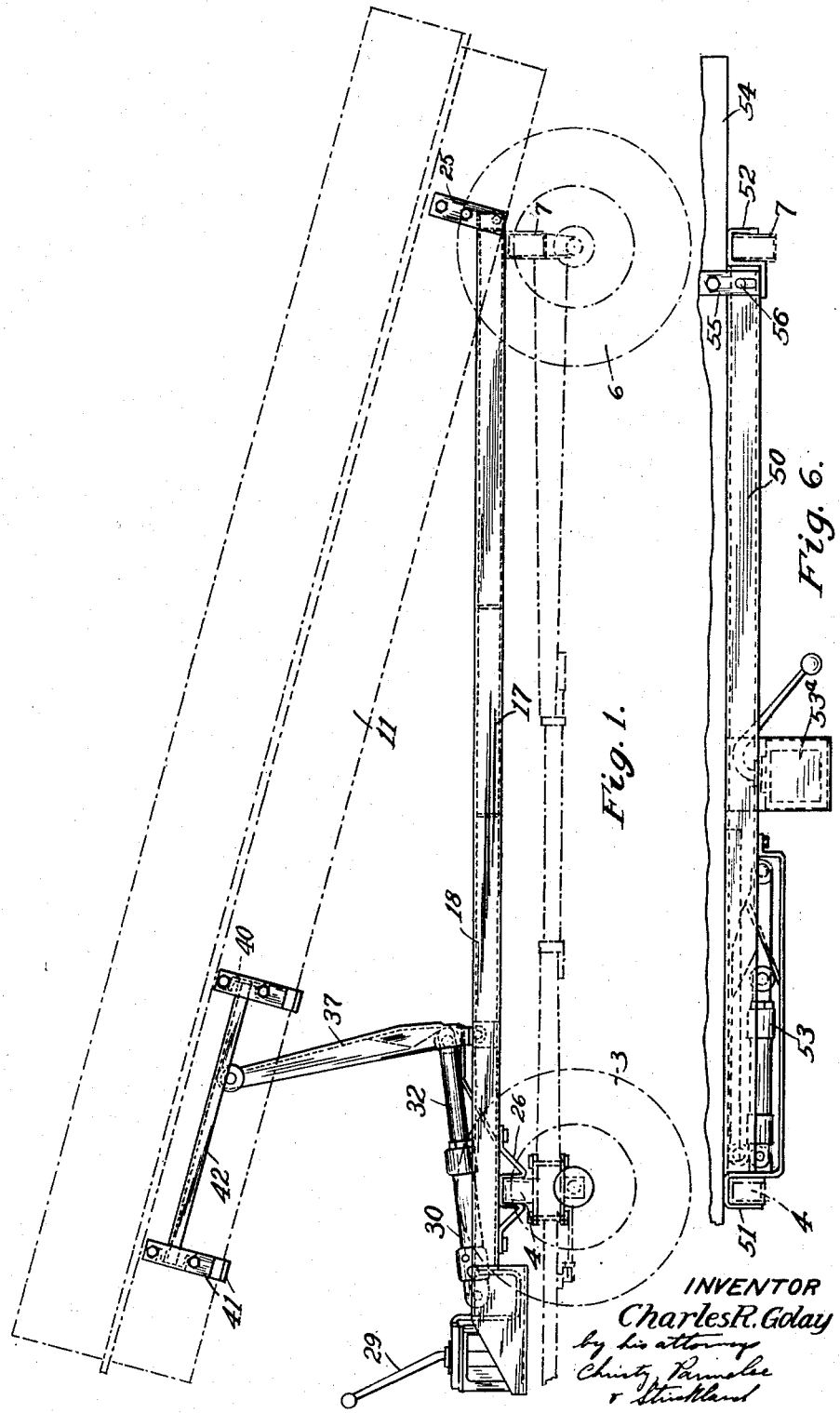

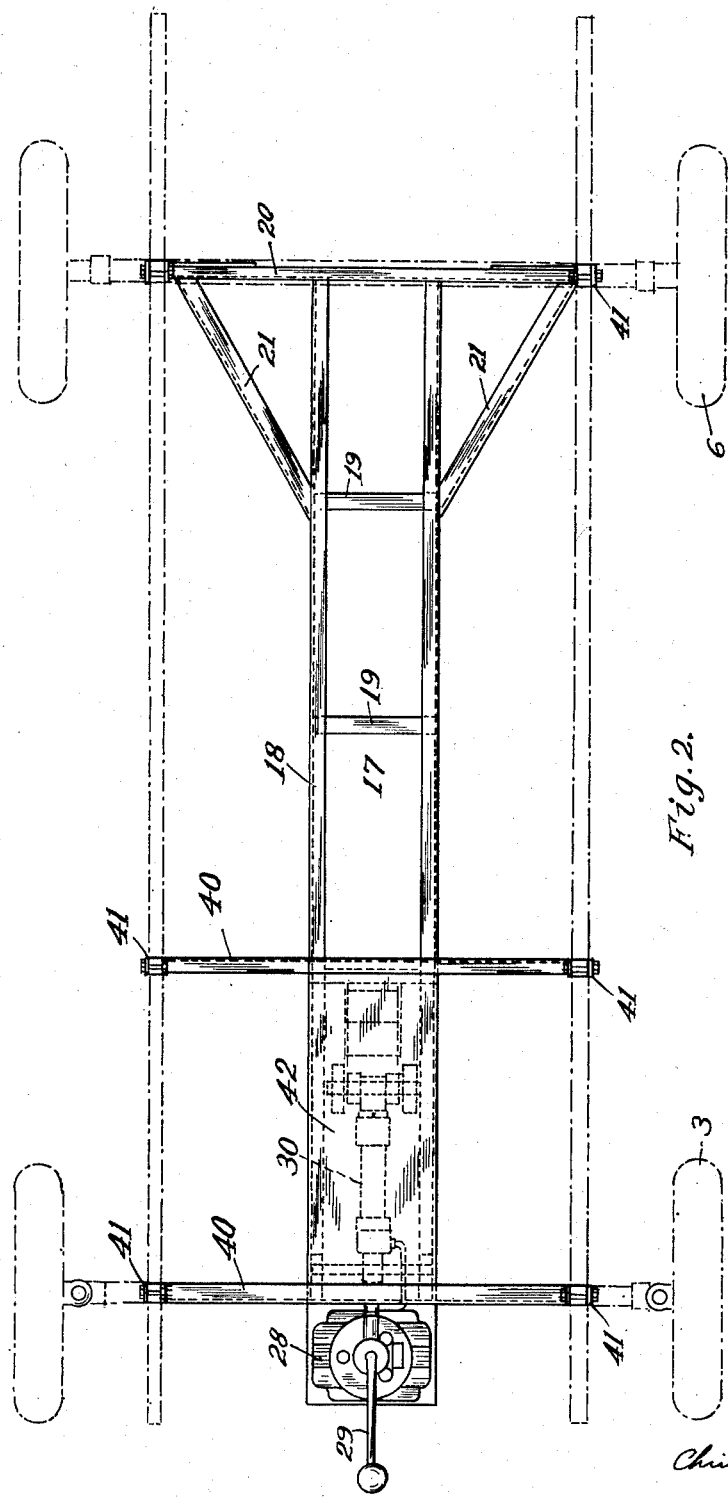

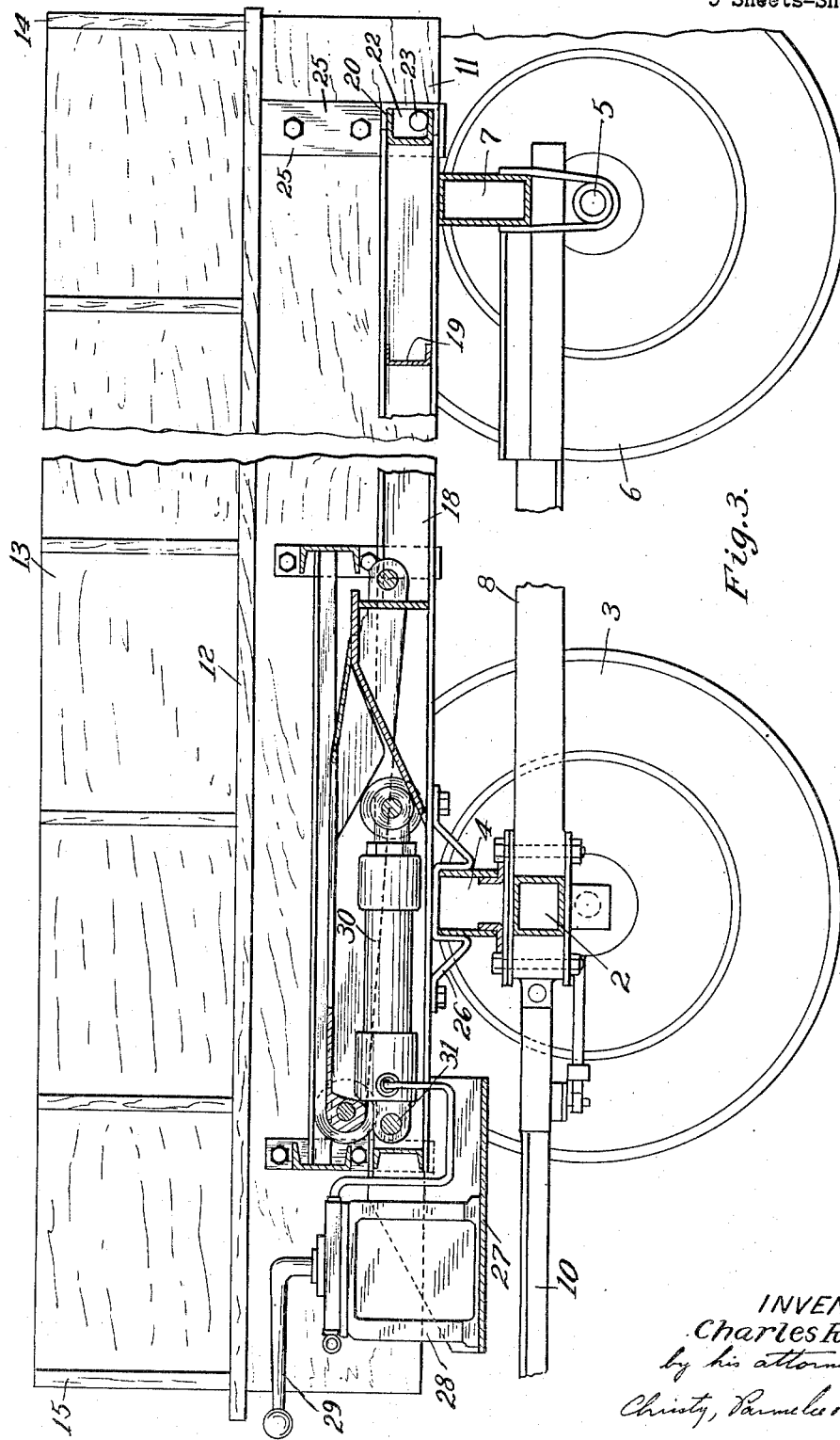

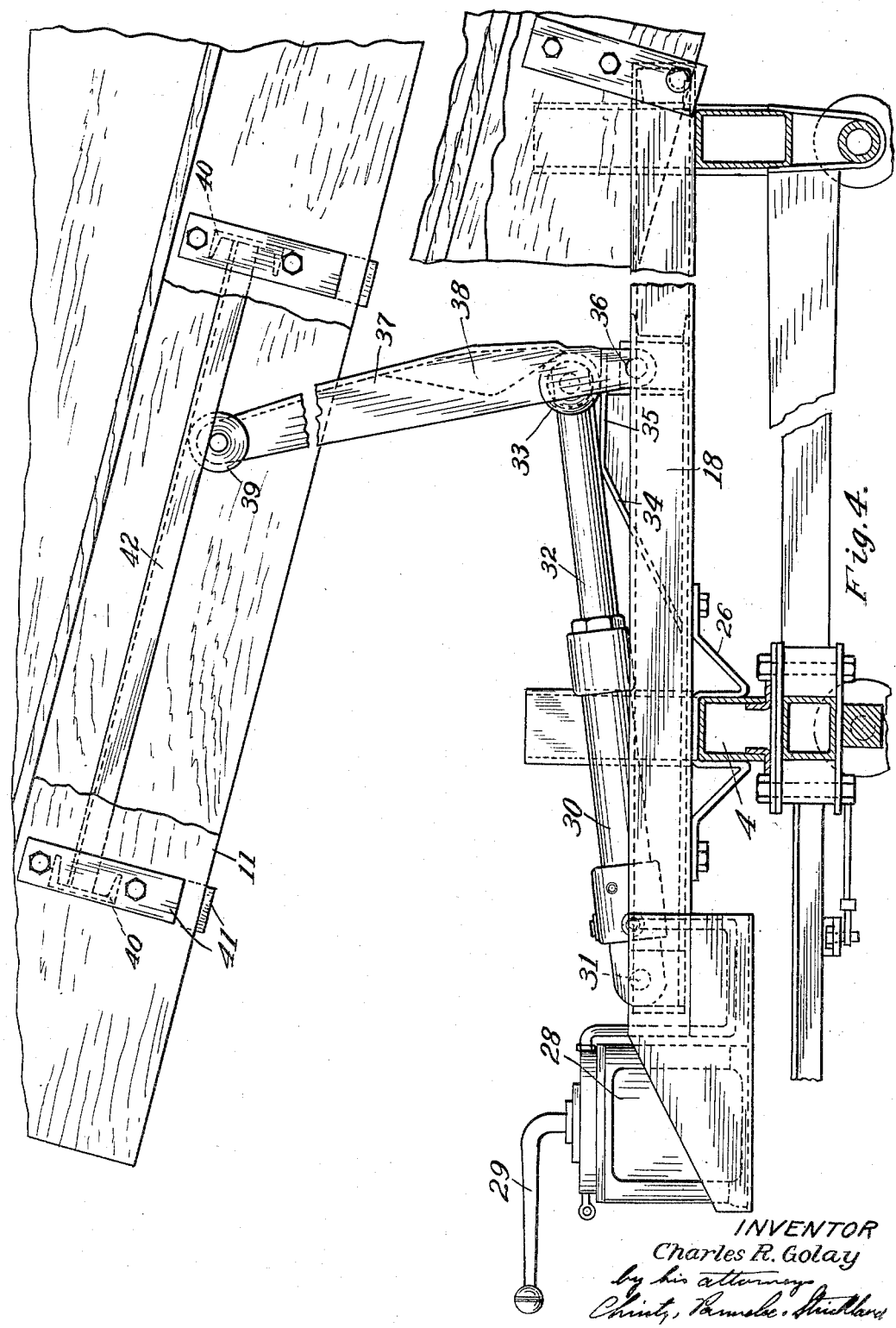

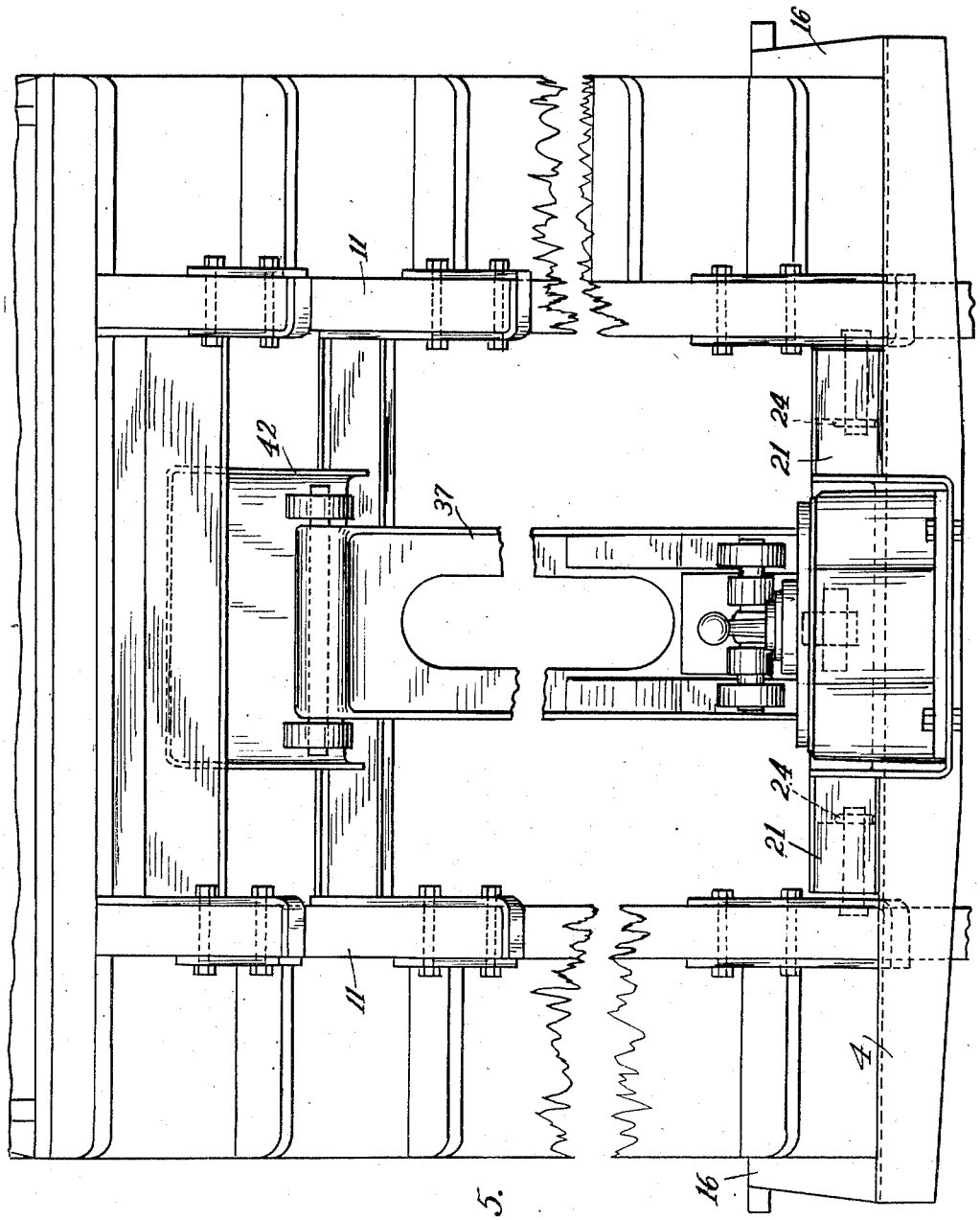

2,555,406

UNITED STATES PATENT OFFICE 2,555,406

DUMP WAGON

Charles R. Golay, Cambridge City, Ind.

Application January 15, 1946, Serial No. 641,210

6 Claims. (Cl. 298—22)

This invention relates to wagons and is for an improvement in wagons of the type generally known as farm wagons, such wagons being designed and adapted particularly to meet the needs of the farmer. However, the invention is not restricted to wagons for any particular field of use.

Farm wagons of a type most widely used, are provided with a relatively long bed or body, usually carried on two parallel beams extending lengthwise of the body. The body so formed rests at its forward end on the bolster over the front axle, and the rear end of the body rests on the rear axle, or the bolster on which the rear axle is carried. Frequently there is provided an adjustable reach extending from the front bolster to the rear one, and diagonal braces or hounds are provided in the structure between the bolsters and the reach to brace the running gear.

It is desirable in wagons of this kind that the body be relatively close to the ground to avoid the manual labor involved in loading and unloading the wagons. In addition to being used for transporting farm machinery, the wagons are commonly used for picking up grain in the fields and hauling it to a point of storage, for carrying heavy loads of feed sacks, and for hauling sacks of fertilizer, and for other purposes in which lifting is required for loading and unloading the wagon.

The object of the present invention is to increase the usefulness of such wagons whereby the body may be tilted by elevating the front end, thus facilitating the unloading of the wagon and the labor of unloading. This is accomplished, according to my invention, by an attachment which may be used in either new wagon construction, or in existing wagons, which is conveniently in the nature of a supplementary frame structure which may be used under the bed without increasing the overall height of the body, and which carries mechanism for elevating the body, the arrangement being such as to accomplish the desired result while distributing the stresses between the body and the running gear in an advantageous manner.

Moreover the attachment is relatively simple, cheap, adds little to the weight of the wagon, and can be installed in the field by a farmer or mechanic with ordinary tools.

My invention may be more fully understood by reference to the accompanying drawings, which illustrate a present preferred embodiment of my invention, and in which:

Fig. 1 is a side elevation of a farm wagon equipped with my invention, showing the bed or body tilted;

Fig. 2 is a plan view of the attachment which is interposed between the running gear of the wagon and the body, and which comprises a novel part of my invention;

Fig. 3 is a longitudinal section on a larger scale showing an operating mechanism which may be used for elevating or tilting the wagon bed;

Fig. 4 is a fragmentary view of the forward end of the wagon with the mechanism for tilting the bed shown in the operation of tilting the bed;

Fig. 5 is a front elevation of the wagon with the body tilted upwardly; and

Fig. 6 is a fragmentary side view of another form of attachment.

In the drawings, the running gear of the wagon is of any usual or preferred construction having a front axle 2 with wheels 3, which are illustrated as being rubber-tired wheels, there being a bolster 4 above the front axle. The rear axle is designated 5, and the rubber-tired rear wheels are designated 6. A bolster 7 is carried on the rear axle. An adjustable reach 8 connects the front and rear wheel assemblies in the usual manner, and diagonally extending hounds may be provided as is customary in the art.

The forwardly extending tongue of the wagon is designated 10.

The body of the wagon comprises two longitudinally extending beams 11 which are spaced apart and which are substantially coextensive with the length of the wagon bed. The bottom 12 of the bed is fastened to these beams. The bed is shown as having sides 13, a front end board 14 and a rear end board 15.

In the usual wagon construction, the bolsters are provided with upstanding posts 16 at each end thereof (see Fig. 5) and the body or bed of the wagon rests on the bolsters and is confined between the side posts 16.

According to the present invention there is provided an attachment comprising a longitudinally extending frame designated generally as 17, and which is preferably comprised of two metal channel sections 18 connected at intervals by transverse braces or connectors 19.

The overall width of the longitudinally extending frame 17 structure provided by the two channels 18 is less than the distance between the two beams 11, so that when this frame is installed on the bolsters of the wagon at the center of the wagon, the beams on the body may rest on the boslters in the usual manner so that the presence of the frame does not raise the overall height of the bed of the wagon in any way.

At the rear end of the longitudinally extending frame there is a transversely extending channel 20 which is of a width greater than the frame, it being of a width such as to extend almost, but not completely the full distance between the two beams 11. Diagonal braces 21 extend from adjacent the free ends of this cross piece to the longitudinally extending frame members 18 to increase the rigidity of the structure.

At each end of the cross member 20 there is a solid block of metal 22 in which is received a pin or trunnion 23, these pins or trunnions being provided at their inner ends with cotter pins 24 (see Figs. 3 and 5). The outer ends of the trunnions 23 are secured to U-shaped metal members 25 fitted to the beams 11 of the wagon bed, these U-shaped members embracing the ends of beams 11 and being bolted thereto as shown.

In making the assembly, the rear end of the bed of the wagon is elevated of course at the time that the metal frame 17 is put in place, and when the end frame is properly in place, the bed of the wagon is lowered so that the beams 11 may fit down into the U-shaped members 25, after which it is only necessary to drill holes and insert the bolts, and in this way the pivotal connection between the rear end of the body and the metal frame is provided. The spacing and size of the beams on farm wagons is standard, and there may be sufficient play in the parts to provide sufficient tolerance as is needed for variation in different wagons.

The rear end of the frame comprised of the two members 18 and the associated parts rests on the rear bolster 7. The forward end rests on the front bolster 4, and projects beyond the front bolster. The sections 18 may be provided on their under surfaces with saddle shaped fittings 26 (see Figs. 3 and 4), which fittings straddle the bolster 4 and hold the attachment against fore and aft movement.

Secured to the forward ends of the sections 18 is a platform 27 supporting a standard hydraulic pump mechanism 28 of any known or preferred construction, this mechanism having an upwardly and forwardly extending handle 29, the pumping action being effected by moving this handle up and down. The pumping mechanism is provided for generating a fluid pressure in a cylinder 30 pivotally supported between the members 18 at 31 for limited movement in a vertical arc. The cylinder 30 has a piston 32 fitted therein, the free end of the piston being provided with a roller 33. Secured between the two longitudinally extending sections 18 is a cam having a sloping surface 34 and a horizontal portion 35 on which the roller 33 may travel. This roller cooperates and serves to actuate an elevating lever which is pivotally secured to the frame at 36, the lever being designated 37. It is provided with a doubly-inclined cam 38 on the portion thereof which cooperates with the roller 33. At the free end of the arm 37 there is another roller 39. For most purposes, the pump is located as herein specifically shown, but since it is connected to the jack through high pressure hose, it may be located elsewhere to suit the convenience of a particular customer, and where the user has a modern tractor for pulling the wagon with a high pressure therein, only a hose and coupling need be provided.

According to the present invention, two transversely extending channels or other heavy metal sections 40 are secured to the body beams 11 by metal fittings 41 that are bolted to the beams and to which the ends of the sections 40 are welded. Extending between these sections and welded thereto is a heavy flanged metal plate 42 for cooperation with the roller 39.

The hydraulic arrangement herein shown and described is generally similar to that shown in my United States Patent No. 2,358,224, dated April 22, 1942, and operates in the manner therein described. When the bed of the wagon is horizontal as shown, for example, in Fig. 3, the piston 32 is retracted into the cylinder 30 and the roller 33 is at the bottom of the incline 34. The lever 37 is nested in a horizontal position over the cylinder with the roller 39 at that end of the plate 42 which is nearest the front of the wagon. When the jack is operated, the roller 33 rides up the incline 34. At the same time it rides up one slope of the cam 38, the lever 37 being opened up like the blade of a jack knife. The roller 39, during this opening movement of the lever 37, rolls on the plate 42, elevating the bed of the wagon. When the parts have reached the position shown in Fig. 4, the roller 33 is exerting a direct end thrust against the lever 38, tending to swing it toward the right.

While the jack mechanism of itself is disclosed in my aforesaid patent, the provision in the present invention of the fittings 42 carrying the transverse braces 40 and the plate 42 for adapting the jack to a standard wagon bed without in any way altering the bed is novel, and contributes substantially to the ease with which the present invention may be adapted to an existing wagon or may be applied to a new wagon construction without in any way departing from present standards of construction. However, in lieu of the specific jack mechanism herein shown and described, other types of jacks for elevating the body may be used.

While farm wagons in general use have a bed as particularly described, with beams on the under side thereof, wagon bodies are extensively used in some sections in which the body has high sides and the bottom sets directly on the bolster. To adapt my invention to this condition, the structural frame attachment is underslung between the bolsters with a saddle portion at each end hung over the bolsters to suspend the unit and the jack is immediately to the rear of the front bolster. In lieu of the U-shaped fittings 25, carrying the pivot pins, strap fittings bolted to the sides of the body are provided. This is shown in Fig. 6 wherein 50 is a frame formed similarly to the frame 17 previously described but having a hanger or saddle plate 51 at its forward end that is set over the front bolster 7 and a similar hanger 52 at the rear to set over the rear bolster 7. The jack mechanism is similar to that previously described and is designated generally as 53. It is close to the front axle. The pump is shown at 53ᵃ. The bed of the wagon is designated 54 and 55 is a strap which engages, by its slotted lower end the pivot pin 56 on the frame. This arrangement does not elevate the body beyond the thickness of the hangers and enables the invention to be used with flat bed wagon bodies.

From the foregoing description it will be seen that my invention provides an attachment which may be quickly and easily installed in the field or elsewhere to a standard farm wagon with no departure in its existing structure and design, and with only those tools which are ordinarily available. To apply the attachment, the bed of the wagon is elevated off the running gear as previously explained, and the frame designated generally as 17 is set into place with the saddle elements 26 set astraddle the bolster over the front axle, the saddle-shaped fittings 26 providing abutments to prevent the frame from shifting in a fore and aft direction. With the frame in place, the fittings 41 with their attached cross members 40 and the plate 42 are secured in place, and then the body is set back onto the wagon. The longitudinally extending frame designated generally as 17 is of course centered along the longitudinal center line of the wagon so that when the body is set down, the beams 11 will rest over the frame 17 and rest on the bolsters of the wagon in the usual manner so that the bed of the wagon is not elevated in any way by the presence of this tilting mechanism. The bed of the wagon is restrained from shifting sideways by the upstanding posts 16 in the usual way.

It will be noted that in elevating the body, the roller 39 moves away from the forward end of the body as the height is increased, so that as the tilting occurs the point of support for the elevated end shifts closer to the middle of the body. This is desirable for a number of reasons, among which are the fact that if the body has a heavy load, less strain is imposed on the beams as the roller approaches closer to the center of the length of the body. In other words, it provides a shifting support with an increasing amount of the load forwardly of the support. While the body is thus supported when it is in its tilted position at a point well in from the forward end of the body, the downward pressure or load is relatively close to the point where the sections 18 rest on the forward bolsters. Hence the load on the sections 18 caused by elevating the wagon body is not sufficiently far from the bolsters as to tend to create stresses to deflect the sections 18, and the sections therefore do not have to be excessively heavy, as would be the case if the elevating mechanism were closer to the middle of the wagon.

While I have shown and described one preferred embodiment of my invention, it will be understood that this is by way of illustration, and that various changes and modifications may be made within the contemplation of my invention. The attachment is relatively cheap to manufacture, easy to install on standard farm wagons, does not increase the overall height of the bed of the wagon, nor does it unduly increase the weight.

I claim:

1. An attachment for a wagon having a body, which body has parallel spaced longitudinal beams on the bottom thereof, the wagon also having a running gear with a front bolster and a rear axle on which said beams rest to support the body, said attachment comprising a frame of a width to fit between said beams and of a height less than the height of the beams and which frame is supported on the front bolster and rear axle, means for holding the frame against endwise movement, means at the forward end of the frame for elevating the body, and means at the rear of the frame providing horizontal trunnions for the body about which the body may tilt, said last named means including a transverse section on the frame with pins projecting therefrom and fittings on the pins for attachment to said beams.

2. A tilting attachment for a farm wagon having a body provided with longitudinally extending parallel beams and a pair of spaced axle supported bolsters on which said beams normally rest to support the body directly thereon which comprises an auxiliary frame supported at its ends respectively by said axle supported bolsters, a pivotal connection at the rear of said frame with said beams, and elevating mechanism carried at the front end of said frame for tilting said beams and body about said pivotal connection from its normal position in which the beams and body are directly supported by said bolsters to a tilted position in which said beams and body are out of direct supporting engagement with said bolsters and are supported on said auxiliary frame by said pivotal connection and elevating mechanism.

3. In a farm wagon, a body having longitudinally extending parallel beams, a pair of spaced axle supported bolsters extending transversely of said beams and normally directly engaged therewith to support said body, an auxiliary frame having supporting engagement at its ends with said bolsters, a pivot mounting at the rear of said frame connecting said beams with said frame for tilting movement with respect thereto, and elevating mechanism mounted on the front end of said frame for tilting said beams and body about said pivot mounting from its normal position in which said beams and body are directly supported on said bolsters to a tilted position in which said beams and body are out of direct supporting engagement with said bolsters and are supported on said auxiliary frame by said pivot mounting and elevating mechanism.

4. A tilting attachment for a farm wagon having a body normally supported on a pair of spaced axle carried bolsters extending transversely thereof which comprises an auxiliary frame supported at its end by said axle carried bolsters, a pivotal connection at the rear of said frame with said body, and elevating mechanism carried at the front end of said frame for tilting said body about said pivotal connection from its normal position in which it is directly supported on said bolsters to a tilted position in which it is out of direct supporting engagement with said bolsters and is supported on said auxiliary frame by said elevating mechanism and pivotal connection.

5. The attachment claimed in claim 4 wherein said auxiliary frame is provided with hook-shaped slings at its ends for engagement with said bolsters to support said frame with its upper surface on a level with the upper surfaces of said bolsters but beneath the under surface of said body.

6. A tilting attachment for a farm wagon having running gear and a body provided with a supporting framework by which it is normally supported directly on said running gear which comprises an auxiliary frame separate from said framework and supported independently thereof on said running gear, a pivotal connection at the rear of said frame with the supporting framework for said body, and elevating mechanism carried at the front of said frame for pivoting said body about said connection from a normal position in which the body and its framework are directly supported by the running gear to a tilted position in which said body and its framework are out of supporting engagement with said running gear and are supported on said auxiliary frame by said elevating mechanism and pivotal connection.

CHARLES R. GOLAY.

REFERENCES CITED

The following references are of record in the file of this patent:

UNITED STATES PATENTS

| Number | Name | Date |
|---|---|---|
| 549,403 | Stailey et al. | Nov. 5, 1895 |
| 771,936 | Rinfenberick | Oct. 11, 1904 |
| 1,550,857 | Winger | Aug. 25, 1925 |
| 2,143,291 | Wachter | Jan. 10, 1939 |
| 2,162,831 | Barrett | June 20, 1939 |
| 2,339,039 | Wood | Jan. 11, 1944 |
| 2,358,224 | Golay | Sept. 12, 1944 |